United States Patent [19]

Noonan et al.

[11] Patent Number: 5,038,596
[45] Date of Patent: Aug. 13, 1991

[54] THREADED COLD WORKING MANDREL

[75] Inventors: Denis E. Noonan, Hicksville; Philip F. Scala, Maspeth, both of N.Y.

[73] Assignee: Grumman Aerospace Corporation, Bethpage, N.Y.

[21] Appl. No.: 444,260

[22] Filed: Dec. 1, 1989

[51] Int. Cl.$^5$ .............................. B21D 9/04
[52] U.S. Cl. .................... 72/391.4; 72/370; 72/454; 72/114
[58] Field of Search ............... 72/114, 454, 391, 393, 72/370, 391.4

[56] References Cited

U.S. PATENT DOCUMENTS

| | | | |
|---|---|---|---|
| 2,519,693 | 8/1950 | Olin | 72/391 |
| 2,641,378 | 6/1953 | Wilt | 72/391 |
| 2,995,266 | 8/1961 | Crawford | 72/454 |
| 3,263,466 | 8/1966 | Shackelford | 72/114 |
| 3,566,662 | 3/1971 | Champoux | 72/370 |
| 3,665,774 | 5/1972 | Bauhus et al. | 74/325 |
| 3,835,688 | 9/1974 | King, Jr. | 72/370 |
| 3,861,185 | 1/1975 | Maddox | 72/391 |
| 3,879,980 | 4/1975 | King, Jr. | 72/393 |
| 3,949,535 | 4/1976 | King, Jr. | 29/446 |
| 4,164,807 | 8/1979 | King, Jr. | 29/523 |
| 4,187,708 | 2/1980 | Champoux | 72/30 |
| 4,402,203 | 9/1983 | Molina | 72/114 |
| 4,423,619 | 1/1984 | Champoux | 72/393 |
| 4,425,780 | 1/1984 | Champoux | 72/370 |
| 4,471,643 | 9/1984 | Champoux et al. | 72/391 |
| 4,524,600 | 6/1985 | Champoux et al. | 72/391 |
| 4,557,033 | 12/1985 | Champoux | 72/391 |
| 4,583,388 | 4/1986 | Hogenhout | 72/393 |
| 4,597,282 | 7/1986 | Hogenhout | 72/370 |
| 4,665,732 | 5/1987 | Hogenhout | 72/393 |
| 4,715,203 | 12/1987 | Wiegenstein | 72/30 |
| 4,809,420 | 3/1989 | Landy et al. | 29/523 |

Primary Examiner—David Jones
Attorney, Agent, or Firm—Pollock, Vande Sande & Priddy

[57] ABSTRACT

A mandrel assembly is utilized to cold work a hole in a structural member which is present in a confined area. A mandrel and sleeve are slipped through one end of the hole. The mandrel length is threaded so that a nut may be turned along its length. Between the nut and the structural member are jaws which retain the sleeve within the hole while the nut is turned. The outward end of the mandrel is fixed by means of clamping flats formed on the outward end so the mandrel may be drawn through the sleeve within the hole as the nut is tightened against the intermediately positioned washer and jaws.

1 Claim, 1 Drawing Sheet

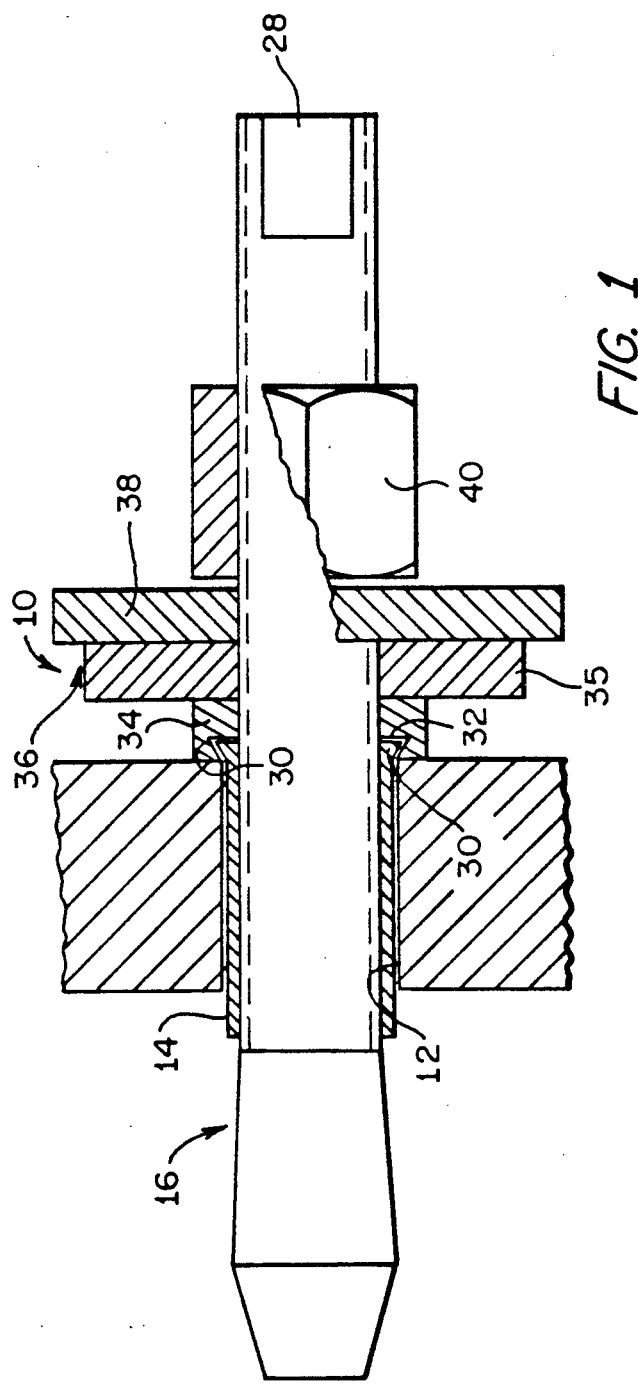
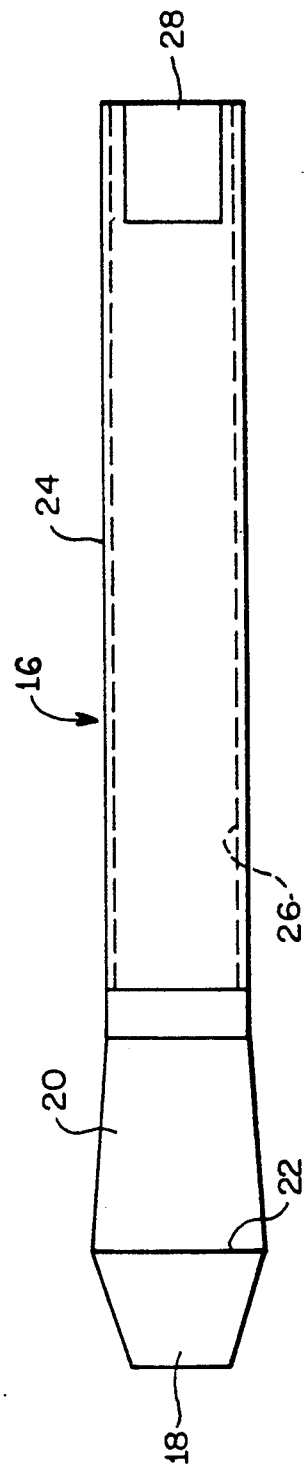

THREADED COLD WORKING MANDREL

FIELD OF THE INVENTION

The present invention relates to cold working of holes in structural members, and more particularly to a threaded mandrel for accomplishing such cold working.

BACKGROUND OF THE INVENTION

In order to increase the fatigue life of certain structural members, particularly those used in aircraft, it has long been recognized that the cold working of holes, which receive fasteners, is advantageous. Customarily, this is achieved by inserting a mandrel and sleeve into a hole, then pulling the mandrel through the sleeve and hole with a powered actuator such as a hydraulic unit. The mandrel and sleeve combination has an outer diameter that is slightly larger than the initial hole diameter; during this process the hole will be expanded to the full diameter of the mandrel plus the sleeve, and after it is pulled through, the finished hole diameter is greater than the start hole but less than the mandrel/sleeve combination. The end result will be a strengthening of the metal structure in the vicinity of the hole wall due to the mandrel cold working.

In initial fabrication of structural members sufficient clearance is usually available so that a powered mandrel can be employed. However, when repairs or retrofitting are in order, limited access exists and powered actuators are often no longer possible. Accordingly, a need exists for displacing the mandrel through a hole for its cold working but in an area where clearance is limited.

BRIEF DESCRIPTION OF THE INVENTION

The present invention offers a solution to the cold working of holes in very limited clearance situations. The structure of the present invention includes a sleeve which is inserted in a drilled hole within a structural member. A mandrel is then slipped into the sleeve and one end of the mandrel is enlarged for cold working the hole when pulled through, while an opposite end of the mandrel is threaded. A threaded nut cooperates with the threads of the mandrel for pulling it through the hole in a controlled manner. Jaws are interposed between the nut and the structural member for maintaining the sleeve in place while the mandrel is being pulled therethrough. The output end of the mandrel threaded portion may have flats formed therein so that the mandrel may be displaced by simply turning a wrench which is in contact with the flats.

The result of an operation using the present invention is the advantageous cold working of a hole in an area with very limited accessibility.

BRIEF DESCRIPTION OF THE FIGURES

The above-mentioned objects and advantages of the present invention will be more clearly understood when considered in conjunction with the accompanying drawings, in which:

FIG. 1 is a partial cut-away view of the present invention illustrating the structure of the threadingly displaceable mandrel;

FIG. 2 is a plan view of the mandrel disassembled from the remainder of the inventive structure.

DETAILED DESCRIPTION OF THE INVENTION

A mandrel assembly of the present invention is generally indicated by reference numeral 10. In FIG. 1 it is coaxially positioned within a hole 12 which will be cold worked by the mandrel and a sleeve 14 which is interposed between the outer diameter of the mandrel and the wall of the hole. A mandrel generally illustrated by reference numeral 16 is seen to include a first frustoconical section 18 which converges in the left direction while extending to a second frusto-conical section 20 converging in the right direction. The two frusto-conical sections 18 and 20 intersect along circular shoulder 22. It is this shoulder which specifies the outer diameter of the mandrel plus the sleeve thickness that forms the maximum expanded diameter of a cold-worked hole.

The sleeve 14 slips over the central portion 24 (FIG. 2) of the mandrel, then the mandrel 16 and sleeve are slipped through one end of hole 12. The left illustrated end of the sleeve is plain but the right illustrated end 30 is flared.

In order to retain the sleeve in place as the mandrel is passed through the hole, a step-up circular jaw assembly 36 is provided. The jaw assembly includes a smaller portion 34 extending to a larger step-up portion 35. The portion 34 includes a reverse countersink 32 for seating the flared end 30 of the sleeve 14. The jaws maintain a non-rotational pressure against the sleeve 14 as the mandrel is being pulled through the sleeve 14. Next, a washer 38 is positioned along the body of the mandrel and is in contacting coaxial relationship with the jaw assembly 36. The washer 38 is positioned between the stepped-up portion 35 of the jaws and a nut 40 which is threadably mounted along the thread 26 of mandrel 16. The outward end portion of the mandrel 16 has flats 28 formed therein for receiving a wrench.

In operation of the device, the mandrel 16 and sleeve 14 are slipped through the hole 12 in a structural member. The sleeve 14 is positioned in between the hole wall and threaded body of mandrel 16. The jaw assembly 36 is then positioned against the flared end 30 of the sleeve 14 and the nut 40 is then screwed to engage the washer 38. Flats 28 are grasped with a wrench. As the nut 40 is rotated, the washer will bear against the jaw assembly 36. As nut 40 is tightened, the mandrel 16 pulls through the sleeve 14 without rotating to cold work hole 12. The sleeve 14 helps create a smooth cold-worked hole by preventing galling as the mandrel is pulled through. As the mandrel enlargement of frusto-conical sections 18 and 20 clear the hole, the jaw assembly may be spring loaded for providing clearance so that the entire length of the mandrel can pass through the hole. The hole in washer 38 is of sufficient diameter to likewise permit complete passage of the mandrel through the hole.

After the mandrel 16 is pulled through the hole, the apparatus may be removed from the hole and reused, except for the sleeve which is disposed.

Thus, from the preceding description of the invention, it will be appreciated that a mandrel assembly is presented which is capable of cold working holes in confined areas which do not permit the utilization of large powered tool heads.

It should be understood that the invention is not limited to the exact details of construction shown and described herein for obvious modifications will occur to persons skilled in the art.

We claim:

1. A mandrel assembly for cold working a hole formed in a structural member, the assembly comprising:
- a mandrel having a threaded body passing through the hole;
- an enlargement formed on one end of the mandrel and normally positioned out of the hole;
- a sleeve coaxially slipped over the mandrel threaded body and having a first plane end adjacent the enlargement, and a second end which is flared;
- a jaw member slidably mounted on the threaded body adjacent the flared end for restraining the sleeve within the hole when the mandrel is drawn therethrough;
- a washer slidably mounted on the threaded body, outwardly of the jaw member;
- a nut threaded on the threaded body of the mandrel for drawing the mandrel through the sleeve as it is tightened thereby cold working the hole; and
- means formed at an end of the mandrel, opposite the enlargement, for enabling the mandrel to be gripped thereby preventing its rotation as it is drawn through the sleeve;
- wherein the jaw member has a first cylindrical section with an end bearing against the washer, and a second cylindrical section stepping diametrically down from the first section for concentrating evenly distributed drawing forces around the flared mandrel end.

* * * * *